(12) United States Patent
Zhu et al.

(10) Patent No.: US 11,870,619 B2
(45) Date of Patent: Jan. 9, 2024

(54) FAST MODULATION RECOGNITION METHOD FOR MULTILAYER PERCEPTRON BASED ON MULTIMODALLY-DISTRIBUTED TEST DATA FUSION

(71) Applicant: SOOCHOW UNIVERSITY, Suzhou (CN)

(72) Inventors: Zhechen Zhu, Suzhou (CN); Zikang Gao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 395 days.

(21) Appl. No.: 17/298,656

(22) PCT Filed: Aug. 20, 2020

(86) PCT No.: PCT/CN2020/110119
§ 371 (c)(1),
(2) Date: May 31, 2021

(87) PCT Pub. No.: WO2021/088465
PCT Pub. Date: May 14, 2021

(65) Prior Publication Data
US 2022/0014401 A1    Jan. 13, 2022

(30) Foreign Application Priority Data
Nov. 6, 2019 (CN) .......................... 201911077041.X

(51) Int. Cl.
*H04B 7/02* (2018.01)
*H04L 27/00* (2006.01)
(Continued)

(52) U.S. Cl.
CPC ......... *H04L 27/0012* (2013.01); *G06N 3/084* (2013.01); *H04B 7/0413* (2013.01)

(58) Field of Classification Search
CPC .... H04L 27/0012; G06N 3/084; G06N 3/048; G06N 3/08; H04B 7/0413; H04B 7/0615; G06F 17/18
(Continued)

(56) References Cited

U.S. PATENT DOCUMENTS 5,271,036 A * 12/1993 Lobert ................... G06N 3/045
455/226.1
8,085,882 B1 * 12/2011 Su ....................... H04L 27/0012
340/933

(Continued)

FOREIGN PATENT DOCUMENTS

| CN | 104618292 A | 5/2015 |
|---|---|---|
| CN | 109547376 A | 3/2019 |
| CN | 110808932 A | 2/2020 |

OTHER PUBLICATIONS

Gao et al., "Distribution Test Based Low Complexity Modulation Classification in MIMO Systems" 2018 10th International Conference on Wireless Communications and Signal Processing (WCSP), Dec. 3, 2018.
(Continued)

*Primary Examiner* — Helene E Tayong
(74) *Attorney, Agent, or Firm* — SZDC Law PC

(57) ABSTRACT

The present invention discloses a fast modulation recognition method for a multilayer perceptron (MLP) based on multimodally-distributed test data fusion. The method sequentially includes: preprocessing a received signal, obtaining a signal feature sequence, generating a matrix of decision statistics data o*$_{hj-}$, generating an MLP an input feature by fusing the decision statistics data, recognizing a modulation mode by using the MLP, and matching an output with a corresponding classification label. The present invention has a low algorithm complexity as compared with a classical likelihood algorithm, and at the same time
(Continued)

improves the recognition precision of a single distribution test algorithm.

6 Claims, 3 Drawing Sheets

(51) Int. Cl.
*G06N 3/084* (2023.01)
*H04B 7/0413* (2017.01)

(58) Field of Classification Search
USPC .......................................................... 375/267
See application file for complete search history.

(56) References Cited

U.S. PATENT DOCUMENTS

| 8,223,890 | B1* | 7/2012 | Su | ............................ H04L 27/38 |
| | | | | 375/340 |
| 8,401,117 | B1* | 3/2013 | Su | ........................ H04L 27/0006 |
| | | | | 375/316 |
| 2011/0301860 | A1 | 12/2011 | Chaires et al. | |

OTHER PUBLICATIONS

Gao et al, "Modulation Classification in MIMO Systems With Distribution Test Ensemble" IEEE Access, vol. 8, pp. 128819-128829 (Jul. 10, 2020).

Gao et al., "Low Complexity MIMO Modulation Classification via Distribution Test Ensembles" 2019 IEEE 5th International Conference on Computer and Communications (ICCC), pp. 1548-1553 (Apr. 13, 2020).

* cited by examiner

FAST MODULATION RECOGNITION METHOD FOR MULTILAYER PERCEPTRON BASED ON MULTIMODALLY-DISTRIBUTED TEST DATA FUSION

This application is the National Stage Application of PCT/CN2020/110119, filed on Aug. 20, 2020, which claims priority to Chinese Patent Application No. 201911077041.X, filed on Nov. 6, 2019, which is incorporated by reference for all purposes as if fully set forth herein.

FIELD OF THE INVENTION

The present invention relates to the field of communication, and specifically, to A fast modulation recognition method for a multilayer perceptron (MLP) based on multimodally-distributed test data fusion.

DESCRIPTION OF THE RELATED ART

Modulation recognition, also referred to as modulation classification, aims to obtain modulation mode information of unknown signals by analyzing the characteristics of the unknown signals. Modulation recognition has been widely applied to the military field, the civilian field, among other fields. In-depth researches have been carried out on a modulation recognition algorithm in a single-input single-output (SISO) system over 30 years. However, the application of the modulation recognition algorithm in a multiple-input multiple-output (MIMO) system is still in an early stage. The first field to which a modulation recognition algorithm is applied is the field of modulation recognition in the MIMO system. In a large-scale MIMO system, as a quantity of antennas increases, the complexity of most existing algorithms correspondingly grows exponentially. Especially, in a large-scale MIMO system, a modulation recognition algorithm that satisfies an actual application requirement is still a great challenge.

There are mainly two types of existing modulation recognition algorithms, that is, a likelihood-based algorithm and a feature-based algorithm. In the likelihood-based algorithm, optimal recognition precision can be obtained in a Gaussian white noise channel by using a statistical model of additive noise. However, the premise of the likelihood-based algorithm is that there are accurate noise power and distribution. During the use of an eigenvalue-based recognition mechanism, although this type of statistical features can adequately complete a modulation recognition task and obtain relatively desirable recognition precision, the mechanism lacks the capability of handling additive noise, and the anti-interference capability of the algorithm is improved by using information such as a signal-to-noise ratio (SNR).

In addition, existing modulation recognition algorithms have one common problem: The calculation costs of signal processing of the algorithms are very high, and the complexity of calculation grows exponentially as a quantity of antennas and a quantity of orders of a modulation mode increase. During the consideration of a high-order modulation mode and a large-scale MIMO system, a common likelihood-based modulation recognition method for a single antenna system has extremely high calculation complexity.

SUMMARY OF THE INVENTION

A technical problem to be resolved by the present invention is to provide a fast modulation recognition method for an MLP based on multimodally-distributed test data fusion, so that algorithm complexity can be reduced and recognition precision can be improved.

To resolve the foregoing technical problem, the present invention provides a fast modulation recognition method for an MLP based on multimodally-distributed test data fusion, including the following steps:

step 1) preprocessing a received signal, a used normalization formula being:

$$r_k = \frac{\Re(r_k) - \overline{\Re(r)}}{\sigma(\Re(r))} + j\frac{\Im(r_k) - \overline{\Im(r)}}{\sigma(\Im(r))},$$

and obtaining a signal feature sequence $\{z_k\}_{k=1}^N$ from the received signal $\{r_k\}_{k=1}^N$;

step 2) obtaining decision statistics data $o^*_{hj-}$ by using four distribution test algorithms: a Kolmogorov-Smirnov (KS) test, a Cramer-Von Mises (CVM) test, an Anderson-Darling (AD) test, and a variance (Var) test, $o^*_{hj-}$ being defined as:

$$t_{mod}^{KS} = \max_{1 \le n \le N} |F_1(z_n) - F_0(z_n | M)|,$$

$$t_{mod}^{CVM} = \int_{-\infty}^{\infty} [F_1(z_n) - F_0(z_n | M)]^2 dF_0(z_n),$$

$$t_{mod}^{AD} = \int_{-\infty}^{\infty} \frac{[F_1(z_n) - F_0(z_n | M)]^2}{F_0(z_n | M)(1 - F_0(z_n | M))} dF_0(z_n | M),$$

$$t_{mod}^{Var} = \frac{1}{N}\sum_{i=1}^{N}(d_i - \mu)^2, \; d_i = F_1(z_n) - F_0(z_n | M), \; \mu = \frac{1}{N}\sum_{i=1}^{N} d_i,$$

where $F_1(z_n)$ is an empirical cumulative distribution of the received signal, $F_0(z_n|M)$ is a theoretical cumulative distribution of a candidate modulation mode, and M is the candidate modulation mode;

step 3) obtaining a matrix of $o^*_{hj-}$:

$$\begin{pmatrix} t_{mod\,1}^{KS} & t_{mod\,2}^{KS} & \cdots & t_{mod\,n}^{KS} \\ t_{mod\,1}^{CVM} & t_{mod\,2}^{CVM} & \cdots & t_{mod\,n}^{CVM} \\ t_{mod\,1}^{AD} & t_{mod\,2}^{AD} & \cdots & t_{mod\,n}^{AD} \\ t_{mod\,1}^{Var} & t_{mod\,2}^{Var} & \cdots & t_{mod\,n}^{Var} \end{pmatrix};$$

step 4) generating an input feature of an MLP classifier by using the matrix, the input feature being defined as:

$$t^*_{mod\,i} = t_{mod\,i}^{KS} + t_{mod\,i}^{CVM} + t_{mod\,i}^{AD} + t_{mod\,i}^{Var}, \; i=1, 2, \ldots, n \text{ where}$$

an input feature of each modulation mode is inputted into the MLP classifier; and step 5) obtaining the input features of different modulation modes after the fusion of decision statistics data, recognizing the modulation modes by the MLP classifier with the input features, and matching an output with a corresponding classification label:

$$\text{label} = \{0, 1, 2, \ldots, n-1\}$$

Further, $\{z_k\}_{k=1}^N$ is a real part, an imaginary part, an amplitude or a phase taken from a received complex signal.

Further, the step of generating the matrix of the decision statistics data $o^*_{hj-}$ is as follows: first, calculating the empirical cumulative distribution $F_1(z_n)$ of the received signal, next, calculating the theoretical cumulative distribution $F_0(z_n|M)$ of the candidate modulation mode, and finally, calculating the decision statistics data $o^*_{hj-}$ in different modulation modes based on the four distribution test algorithms.

Further, data fusion is performed on the matrix of $o^*_{hj-}$ in a column addition manner.

Further, the MLP classifier uses a forward propagation technology and a backward propagation technology to train a model and update weights.

Further, recognition precision is calculated after the training ends, and the recognition precision $$P_{acc} = \frac{N_c}{N_{total}} \times 100\%$$

is calculated for a classification result of the MLP classifier, where $N_c$ is a quantity of accurately classified samples, and $N_{total}$ is a total quantity of test signal samples.

Beneficial effects of the present invention are as follows:

1. In a MIMO system, compared with a maximum likelihood (ML) modulation recognition algorithm, the proposed modulation recognition algorithm may obtain lower algorithm complexity.

2. For modulation modes such as BPSK, 8PSK, 4QAM, and 16QAM, recognition precision not less than 90% is implemented in the case of an SNR greater than 10 dB, and a recognition time is only related to a quantity of signal samples.

3. A modulation recognition algorithm proposed for a scenario of a fading channel has very high robustness.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
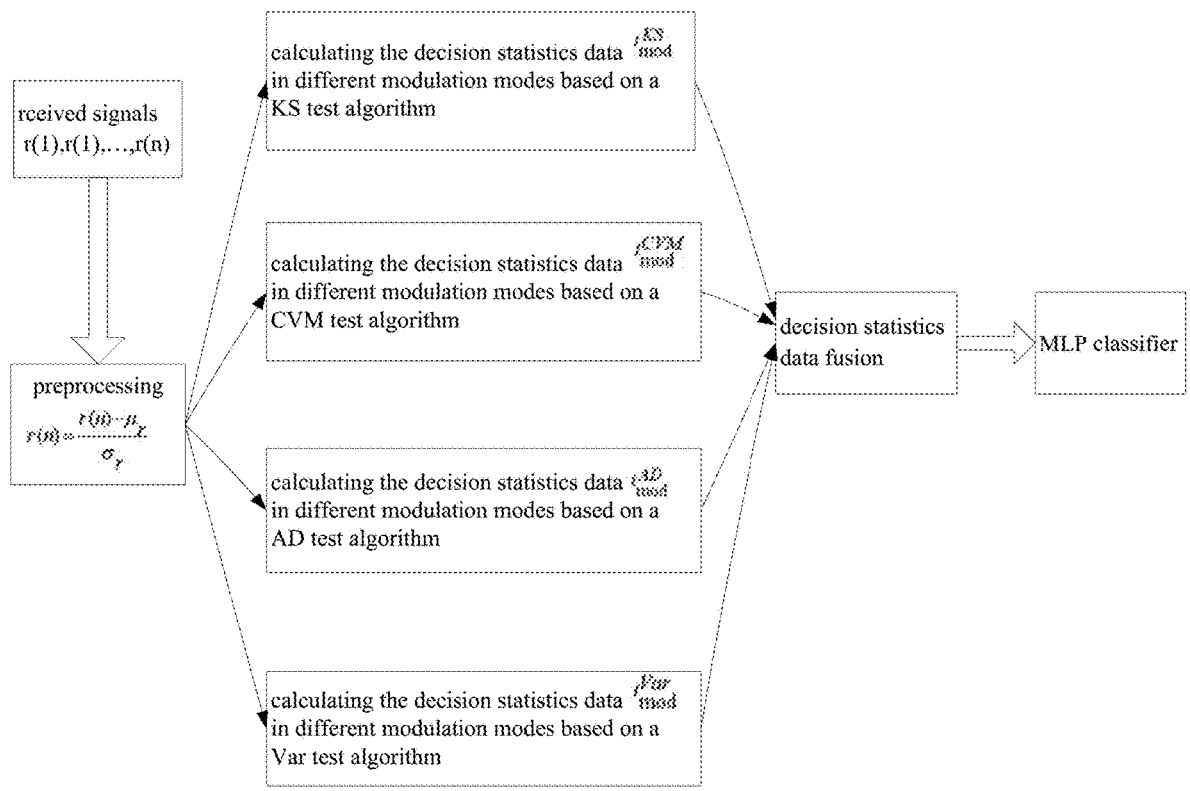
FIG. 1 is a flowchart of a DTE (Distribution Test Ensemble) algorithm according to the present invention.

Referring to FIG. 1, an embodiment of a fast modulation recognition method for a MIMO communication system based on multimodally-distributed test data fusion of the present invention is provided. The method sequentially includes steps of preprocessing a received signal, obtaining a signal feature sequence, generating a matrix of decision statistics data $o^*_{hj-}$, generating an input feature of an MLP classifier and an output result of the MLP classifier, where the MLP classifier requires learning, and calculating recognition precision.

In the present invention, an experimental simulation stage includes four modulation signals M={BPSK,8-PSK,4-QAM,16-QAM}. Amplitude components of the received signal are used. The length (N) of a signal sample is 128. A quantity ($N_T$) of transmit antennas is 2. A quantity ($N_R$) of receive antennas is 4.

The invention has good recognition performance in different channel conditions. In a Gaussian noise channel, when an SNR is greater than 16 dB, the method in the present invention may reach a recognition accuracy of 90%. In a fading channel, the method in the present invention has robustness in both a frequency shift case and a phase shift case, and the recognition rate is nearly not affected.

Specifically, in the step of preprocessing the received signal, the received signal is first preprocessed before the recognition of a modulation mode. In a preprocessing manner, the distribution of real parts and imaginary parts of imaginary signals are normalized. A normalization formula is:

$$r_k = \frac{\Re(r_k) - \overline{\Re(r)}}{\sigma(\Re(r))} + j \frac{\Im(r_k) - \overline{\Im(r)}}{\sigma(\Im(r))}.$$

In the step of obtaining the signal feature sequence, because the real part component, imaginary part component, amplitude, and phase of a signal all carry information of the signal to different degrees, the signal feature sequence $\{z_k\}_{k=1}^N$ of a distribution test can be extracted from the real part component, imaginary part component, amplitude, and phase. In the present invention, an amplitude component $z_k = |r_k| = \sqrt{\Re\{r_k\}^2 + \Im\{r_k\}^2}$ of the signal is selected in an experimental simulation stage.

In the step of generating the matrix of the decision statistics data $o^*_{hj-}$ is as follows: An empirical cumulative distribution $F_1(z_n)$ of the received signal is first calculated. Next, a theoretical cumulative distribution $F_0(z_n|M)$ of a candidate modulation mode is calculated. The decision statistics data $o^*_{hj-}$ in different modulation modes is then calculated based on distribution test algorithms: a KS test, a CVM test, an AD test, and a Var test, to construct a matrix of the decision statistics data:

$$\begin{pmatrix} t^{KS}_{mod\,1} & t^{KS}_{mod\,2} & \cdots & t^{KS}_{mod\,n} \\ t^{CVM}_{mod\,1} & t^{CVM}_{mod\,2} & \cdots & t^{CVM}_{mod\,n} \\ t^{AD}_{mod\,1} & t^{AD}_{mod\,2} & \cdots & t^{AD}_{mod\,n} \\ t^{Var}_{mod\,1} & t^{Var}_{mod\,2} & \cdots & t^{Var}_{mod\,n} \end{pmatrix}.$$

In the step of generating the input feature of the MLP classifier, for a 4×n matrix of the decision statistics data obtained in the foregoing step, in the present invention, a column addition manner is used for data fusion, to obtain n $t^*_{mod} = t_{mod\,i}^{KS} + t_{mod\,i}^{CVM} + t_{mod\,i}^{AD} + t_{mod}^{Var}$, i=1, 2, . . . , n.

An input feature of each modulation mode is inputted into the MLP classifier. Finally, the modulation mode is recognized by using the MLP classifier, and an output is matched with a corresponding classification label:

label={0,1,2, . . . ,$n$−1}

Before formal use, the MLP classifier requires learning. A forward propagation technology and backward propagation technology are used to train a model and update weights. In the present invention, a quasi-Newton method is used, an activation function is set to an inverse trigonometric function (tanh), the quantity of layers of a neural network is 3, the quantity of hidden neurons is 8, there are both 1000 training samples and 1000 test samples, and the maximum quantity of iterations is 300 epochs.

In the step of calculating the recognition precision, the recognition precision $$P_{acc} = \frac{N_c}{N_{total}} \times 100\%$$

is calculated for a classification result of the MLP classifier, where $N_c$ is a quantity of accurately classified samples, and $N_{total}$ is a total quantity of test signal samples.

In the method in the present invention, it is fully considered that in the case of a high-order modulation mode and a large-scale MIMO system, a common likelihood-based modulation recognition method for a single antenna system has very high calculation complexity. To resolve the problem of calculation complexity, the method in the present invention uses a distribution test-based algorithm to resolve a modulation recognition problem in a MIMO environment.

Figure 2:
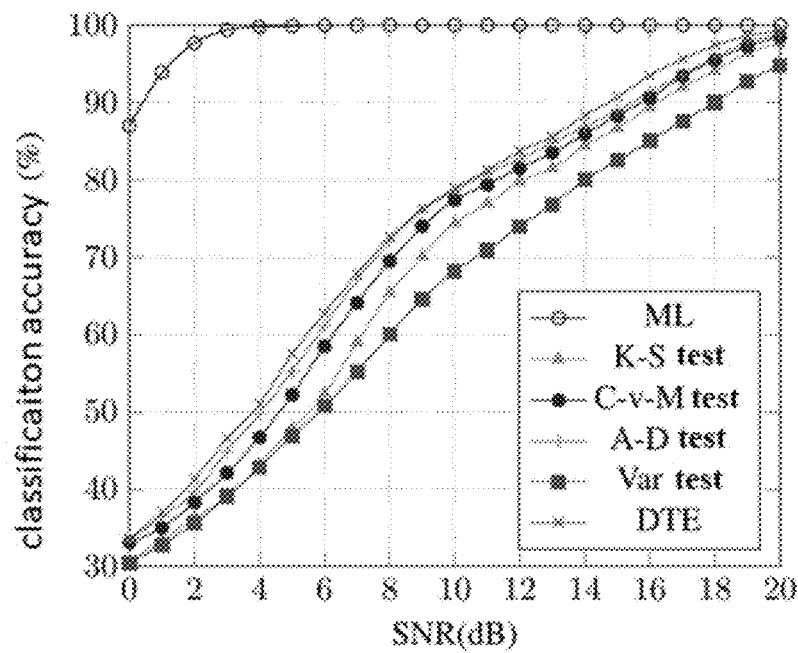
FIG. 2 is a diagram of experimental simulation results in a Gaussian noise channel of a DTE algorithm according to the present invention.

FIG. 2 shows the comparison of recognition performance of different recognition algorithms in different SNRs. The algorithm in the present invention may be referred to as DTE for short, and is better than a classical distribution test algorithm in the entire SNR. Particularly, at a high SNR, when SNR=16 dB, the recognition rate is higher than that of an AD test algorithm by 2%.

Figure 3:
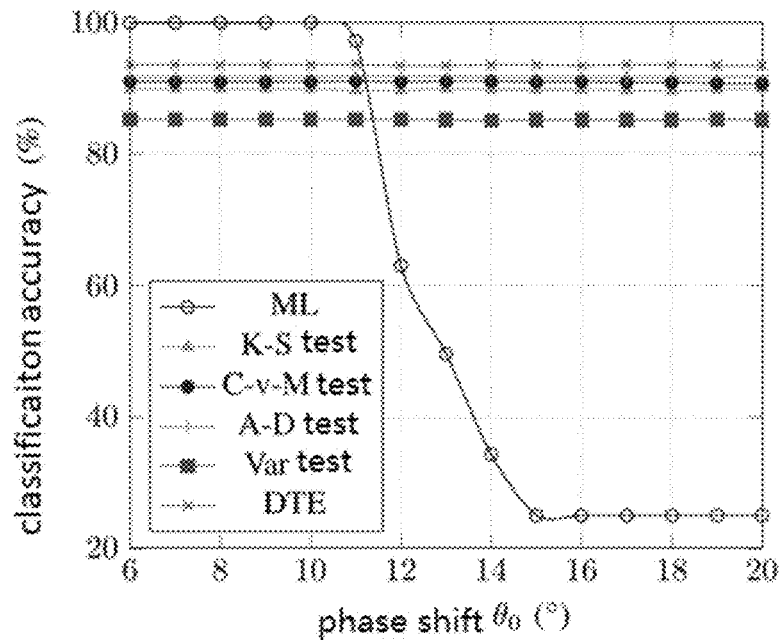
FIG. 3 is a diagram of experimental simulation results in a phase shift channel of a DTE algorithm according to the present invention.
Figure 4:
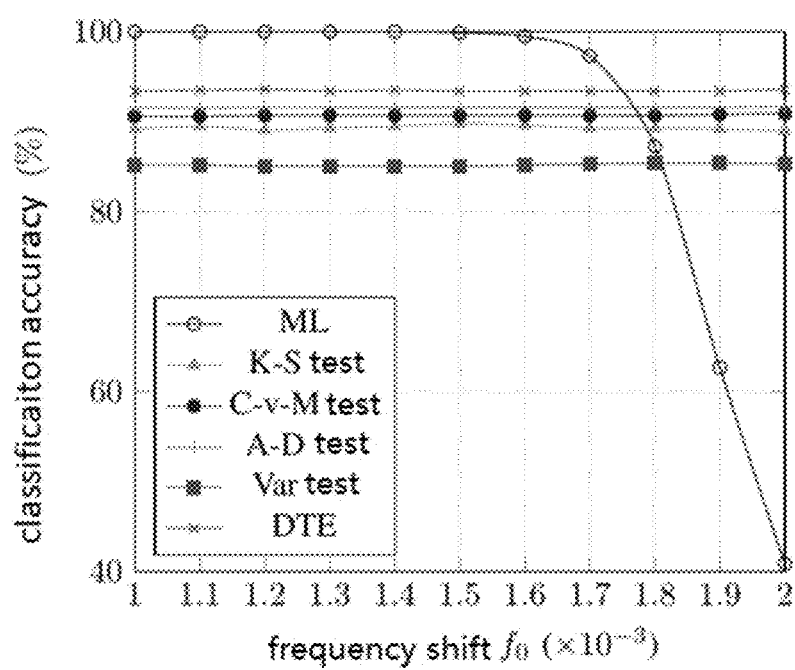
FIG. 4 is a diagram of experimental simulation results in a frequency shift channel of a DTE algorithm according to the present invention.

FIG. 3 and FIG. 4 show the robustness of the algorithm in the present invention in different fading channel conditions. It is very clear that an ML algorithm is highly susceptible to the impact of a frequency shift and a phase shift, the shift degree is excessively large, and the recognition performance of the ML algorithm is greatly reduced.

As shown in Table 1:

The comparison of calculation complexity of different algorithms is given. A classical ML algorithm includes exponential operation, and as a result the complexity of the algorithm is greatly increased. However, the algorithm in the present invention only involves addition and multiplication and has clear advantages.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A fast modulation recognition method for a multilayer perceptron based on multimodally-distributed test data fusion, comprising the following steps:

step 1) preprocessing a received signal, a used normalization formula being:

$$r_k = \frac{\Re(r_k) - \overline{\Re(r)}}{\sigma(\Re(r))} + j\frac{\Im(r_k) - \overline{\Im(r)}}{\sigma(\Im(r))},$$

and obtaining a signal feature sequence $\{z_k\}_{k=1}^N$ from the received signal $\{r_k\}_{k=1}^N$, wherein $\Re(r_k)$ and $\Im(r_k)$ represent a real part and an imaginary part of the kth complex signal $r_k$ respectively, $\overline{\Re(r)}$ and $\overline{\Im(r)}$ represent a mean value of the real part and imaginary part of the complex signal respectively, and $\sigma(\Re(r))$ and $\sigma(\Im(r))$ represent a standard deviation of the real part and imaginary part of the complex signal respectively;

step 2) obtaining decision statistics data $t^*_{mod}$ by using four distribution test algorithms: a Kolmogorov-Smirnov (KS) test, a Cramer-Von Mises test, an Anderson-Darling test, and a variance test, $t^*_{mod}$ being defined as:

$$t^{KS}_{mod} = \max_{1 \leq n \leq N} |F_1(z_n) - F_0(z_n \mid M)|,$$

$$t^{CVM}_{mod} = \int_{-\infty}^{\infty} [F_1(z_n) - F_0(z_n \mid M)]^2 dF_0(z_n),$$

$$t^{AD}_{mod} = \int_{-\infty}^{\infty} \frac{[F_1(z_n) - F_0(z_n \mid M)]^2}{F_0(z_n \mid M)(1 - F_0(z_n \mid M))} dF_0(z_n \mid M),$$

| Classifier | Addition | Multiplication | Logarithm | Exponent |
|---|---|---|---|---|
| ML | $6NM^{N_T}N_R \cdot \sum_{m=1}^{M^{N_T}} I_m$ | $5NM^{N_T}N_R \cdot \sum_{m=1}^{M^{N_T}} I_m$ | $NM^{N_T}N_R$ | $NM^{N_T}N_R \cdot \sum_{m=1}^{M^{N_T}} I_m$ |
| K-S test | $MN_R(\log_2 N + 2N)$ | 0 | 0 | 0 |
| C-v-M test | $MN_R(\log_2 N + 3N)$ | $NMN_R$ | 0 | 0 |
| A-D test | $MN_R(\log_2 N + 3N)$ | $2NMN_R$ | 0 | 0 |
| Var test | $MN_R(\log_2 N + N)$ | 0 | 0 | 0 |
| DTE | $MN_R(4\log_2 N + 9N)$ | $3NMN_R$ | 0 | 0 |
| MLP | $\sum_{k=2}^{l} n_{k-1} n_k$ | $\sum_{k=2}^{l} n_{k-1} n_k$ | 0 | 0 |

-continued $$t^{Var}_{mod} = \frac{1}{N}\sum_{i=1}^{N}(d_i - \mu)^2, \, d_i = F_1(z_n) - F_0(z_n \mid M), \, \mu = \frac{1}{N}\sum_{i=1}^{N} d_i,$$

wherein $F_1(z_n)$ is an empirical cumulative distribution of the received signal, $F_0(z_n|M)$ is a theoretical cumulative distribution of a candidate modulation mode, $Z_n$ is a $n^{th}$ received signal, N is a number of feature values of the received signal organized in order, $d_i$ is a difference between the empirical cumulative distribution and the theoretical cumulative distribution, μ is a mean of the difference $d_i$, n is a total number of the candidate modulation mode, and M is the candidate modulation mode;

step 3) obtaining a matrix of $t^*_{mod}$:

$$\begin{pmatrix} t^{KS}_{mod\ 1} & t^{KS}_{mod\ 2} & \cdots & t^{KS}_{mod\ n} \\ t^{CVM}_{mod\ 1} & t^{CVM}_{mod\ 2} & \cdots & t^{CVM}_{mod\ n} \\ t^{AD}_{mod\ 1} & t^{AD}_{mod\ 2} & \cdots & t^{AD}_{mod\ n} \\ t^{Var}_{mod\ 1} & t^{Var}_{mod\ 2} & \cdots & t^{Var}_{mod\ n} \end{pmatrix},$$

wherein $t_{mod1}^{ks}$ is equivalent to $$\max_{1 \le n \le N} \left| F_1(z_n) - F_0(z_n \mid M) \right|$$

when tested against a first of the candidate modulation mode M, $t_{mod1}^{CVM}$ is equivalent to $\int_{-\infty}^{\infty}[F_1(z_n)-F_0(z_n|M)]^2 dF_0(z_n)$
when tested against a first of the candidate modulation mode M, $t_{mod1}^{AD}$ is equivalent to $$\int_{-\infty}^{\infty} \frac{[F_1(z_n) - F_0(z_n \mid M)]^2}{F_0(z_n \mid M)(1 - F_0(z_n \mid M))} dF_0(z_n \mid M)$$

when tested against a first of the candidate modulation mode M, $t_{mod1}^{Var}$ is equivalent to $$\frac{1}{N}\sum_{i=1}^{N}(d_i - \mu)^2$$

when tested against a first of the candidate modulation mode M, $t_{modn}^{KS}$ is equivalent to $$\max_{1 \le n \le N} \left| F_1(z_n) - F_0(z_n \mid M) \right|$$

when tests against an $n^{th}$ of the candidate modulation mode M, $t_{modn}^{CVM}$ is equivalent to $\int_{-\infty}^{\infty}[F_1(z_n)-F_0(z_n|M)]^2 dF_0(z_n)$
when tested against an $n^{th}$ of the candidate modulation mode M, and $t_{modn}^{AD}$ is equivalent to $$\int_{-\infty}^{\infty} \frac{[F_1(z_n) - F_0(z_n \mid M)]^2}{F_0(z_n \mid M)(1 - F_0(z_n \mid M))} dF_0(z_n \mid M)$$

when tests against an $n^{th}$ of the candidate modulation mode M, and $t_{modn}^{Var}$ is equivalent to $$\frac{1}{N}\sum_{i=1}^{N}(d_i - \mu)^2$$

when tests against an $n^{th}$ of the candidate modulation mode M;

step 4) generating an input future of an MLP (multi-layer perception) classifier by using the matrix, the input future being defined as:

$t^*_{mod}=t_{mod\ i}^{KS}+t_{mod\ i}^{CVM}+t_{mod\ i}^{AD}+t_{mod\ i}^{Var}$, i=1, 2, . . . ,n, wherein an input feature of each modulation mode is inputted into the MLP classifier; and stp 5) obtaining the input features of different modulation modes after the fusion of decision statistics data, recognizing the modulation modes by the MLP classifier with the input features, and matching an output with a corresponding classification label:

label={0,1,2, . . . ,n−1}

2. The fast modulation recognition method for a multi-layer perceptron based on multimodally-distributed test data fusion according to claim 1, wherein $\{z_k\}_{k=1}^N$ is a real part, an imaginary part, an amplitude or a phase taken from a received complex signal.

3. The fast modulation recognition method for a multi-layer perceptron based on multimodally-distributed test data fusion according to claim 1, wherein the step of generating the matrix of the decision statistics data $t^*_{mod}$ is as follows: first, calculating the empirical cumulative distribution $F_1(z_n)$ of the received signal, next, calculating the theoretical cumulative distribution $F_0(z_n|M)$ of the candidate modulation mode, and finally, calculating the decision statistics data $t^*_{mod}$ in different modulation modes based on the four distribution test algorithms.

4. The fast modulation recognition method for a multi-layer perceptron based on multimodally-distributed test data fusion according to claim 1, wherein data fusion is performed on the matrix of $t^*_{mod}$ in a column addition manner.

5. The fast modulation recognition method for a multi-layer perceptron based on multimodally-distributed test data fusion according to claim 1, wherein the MLP classifier uses a forward propagation technology and a backward propagation technology to train a model and update weights.

6. The fast modulation recognition method for a multi-layer perceptron based on multimodally-distributed test data fusion according to claim 5, wherein recognition precision is calculated after the training ends, and the recognition precision $$P_{acc} = \frac{N_c}{N_{total}} \times 100\%$$

is calculated for a classification result of the MLP classifier, wherein $N_c$ is a quantity of accurately classified samples, and $N_{total}$ is a total quantity of test signal samples.

* * * * *